April 12, 1932. W. F. HORSTING 1,853,813
LIQUID MEASURING DEVICE
Filed Aug. 14, 1930
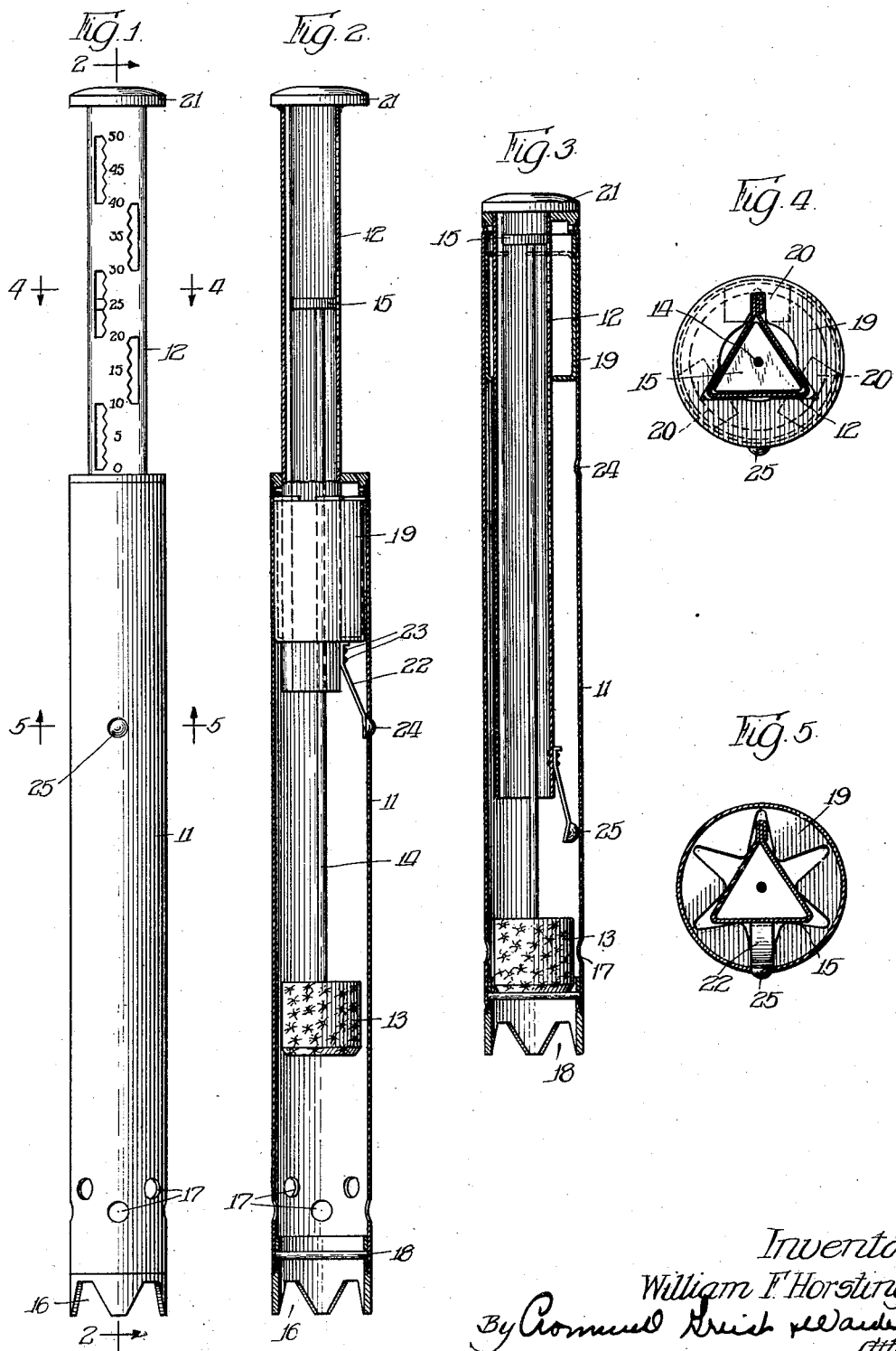

Patented Apr. 12, 1932

1,853,813

UNITED STATES PATENT OFFICE

WILLIAM F. HORSTING, OF WILMETTE, ILLINOIS

LIQUID MEASURING DEVICE

Application filed August 14, 1930. Serial No. 475,166.

The present invention relates to devices for measuring liquids and particularly liquids contained in large tanks such as the tanks employed in gasoline filling stations and the like.

Heretofore it has been difficult to accurately measure the amount of liquid contained within a large tank, particularly tanks that are beneath the ground or so located that it is necessary to measure the contents through a fill pipe or opening in the top of the tank. This difficulty is particularly experienced by gasoline filling stations.

In ordinary practice, the filling station receives its supply of gasoline from an oil company which is generally conveyed to the filling station by means of wagons or trucks, and the method that has been practiced for measuring the contents of the tank at the filling station is by the insertion of a hand graduated stick. Some of the difficulties in measuring volatile liquids, such as gasoline, by this method is that the gasoline creeps up the side of the stick a short distance above the level of the liquid in the tank and, consequently, the reading on the stick is inaccurate. A variance in reading of half an inch in a large tank may represent a substantial quantity of liquid.

A further difficulty with this method of measurement results when the liquid in the tank is in motion to even a slight degree, such as may be the case for some time after liquid is added to the tank.

Because of these and other inaccuracies in measuring liquid in tanks of this character, it is next to impossible for a service station attendant or one in charge of such a tank to determine accurately, first, how much liquid there is in the tank at any desired time, and, second, how much fluid may be added to the tank during a filling operation.

One of the primary objects of the present invention is the provision of a measuring device which is accurate for measuring the contents of liquid in large tanks.

Another object of the invention is the provision of such a device which is simple in construction and which may be conveniently used without changing the equipment generally employed with liquid-containing tanks, and a still further object of the invention is the provision of a measuring device of the character described which may be collapsed so as to be conveniently stored and handled.

Other objects and advantages of the invention will be obvious to those skilled in the art upon understanding the preferred form thereof illustrated in the accompanying drawings and hereinafter described. It is to be understood, however, that this disclosure is given for purposes of illustration only since changes may be made in the preferred construction without departing from the true spirit and scope of the invention as defined by the appended claims.

Referring to the drawings:

Fig. 1 is a view in side elevation showing the device in an extended position;

Fig. 2 is a view in cross section on the line 2—2 of Fig. 1;

Fig. 3 is a view in cross section showing the device in collapsed position;

Fig. 4 is a view in cross section on the line 4—4 of Fig. 1; and

Fig. 5 is a view in cross section on the line 5—5 of Fig. 1.

The device comprises an elongated tube illustrated in the drawings by the reference numeral 11, which tube is adapted to pass through the fill pipe of a tank and to the bottom thereof. Slidably mounted within the tube 11 is a hollow tube or scale 12 and floatably mounted within the tubes 11 and 12 is a float 13 to which is attached an upright rod 14 having an indicator 15 on the top end thereof.

The tube 11 is notched at the bottom as indicated by the reference numeral 16 to form piercing prongs which will cut through any sediment and rest upon the bottom of the tank to permit of accurate calibration and measurement. The tube is also provided with a plurality of ports 17 near the bottom which permit the flow of fluid therethrough into the interior of the tube. A pin at 18 passes through the tube at a fixed distance from the bottom end thereof to afford a stop which prohibits the float 13 from dropping out of the bottom of the tube and which also cooperates with the indicator rod to form an unvariable gauge from which the rod may be measured when it is necessary to provide a new rod or from which other measurements may be taken in the apparatus when adjusting or repairing the same.

A spacing and guiding member 19 is provided in the top of the tube 11 which is cylindrical in shape so as to fit snugly against the inner walls of the tube and may be held in place by means of eyelets or rivets. The member 19 is cut downwardly at intervals to form segments 20 which are bent inward and slotted at their ends to receive the scale 12. The bottom of the member 19 is crimped inwardly as shown in Fig. 5 to form a star shape so positioned in relation to the segments 20 as to permit slidable movement of the scale 12 therethrough. The member 19 serves, therefore, not only to permit slidable movement of the scale, but also to space the same away from the walls of the tube 11 so that in the event the tube becomes slightly dented free movement of the scale is not interfered with.

A flanged cap 21 is provided at the top end of the scale 12, which flanged cap acts as a stop to prohibit the scale 12 from being entirely inserted in the tube 11 and likewise forms a smooth surface to finish off the top of the device when it is in collapsed position, as shown in Fig. 3. The hollow scale 12 is provided with openings in the walls thereof so that the position of the indicator 15 therein may be apparent when the device is in operation. The scale is graduated, as shown in Fig. 1, so that the amount of liquid in the tank being measured is visibly indicated.

In order to hold the scale 12 in extended or measuring position, a spring locking device is attached thereto. This locking device comprises a spring member 22 which is attached to the outside wall of the scale near the bottom thereof by means of rivets or similar fastening members indicated at 23. A semi-circular shaped head 24 is attached to the free end of the spring member 22. Cooperating with the head 24 an opening 25 is provided in the side wall of the tube 11 near the top thereof and in such position that when the scale 12 is extended the head 24 will pass through the opening 25 and lock the scale in place. In order that the fastening head will be in juxtaposition to the hole 25 when the scale is distended, the scale and openings in the member 19 may be polygonal in shape so that it will not rotate within the tube 11. In the drawings, a triangular shape is disclosed although, obviously, the scale might be of any polygonal shape or a guide for the scale might be provided in the tube 11 were it desirable to have it round. In order to release the locking device, the projecting semi-circular shaped member 24 is depressed and the scale 12 slid in the tube 11.

The collapsing feature of this device is of extreme importance when it is considered that tanks for containing liquid are very often buried several feet beneath the ground and are generally a number of feet in diameter or depth. Consequently, a device which would not be collapsible would be difficult to handle and to store when not in use.

In the operation of the device, it is first necessary to accurately calibrate it for each tank that is to be measured. This may be done by inserting the device within the tank and filling the tank with liquid in measured quantities and, as each unit of liquid is added the indicator 15 rises under the influence of the float 13 and the amount is marked on the scale. A more convenient method of calibration is to provide an arbitrary system of marking on the scale and then make a graph or table indicating what each unit on the scale represents in terms of gallons. For example, if the scale is marked from one to 50, as shown in the drawings, and is inserted in a ten hundred gallon circular tank the numeral 10 on the scale may indicate that the tank contains fifty gallons of liquid, the numeral 20 that it contains four hundred gallons and the numeral 25 that it contains five hundred gallons, and so on.

This last method of calibration is particularly desirable if the device is to be utilized for measuring the contents of several tanks since a table or graph may be made up for each tank, thus when the device is used with tank No. 1 graph or table No. 1 would be utilized and with tank No. 2 graph or table No. 2, etc.

Of course, once the device has been properly calibrated for a particular tank it may always be utilized with that tank and the readings taken will be accurate without further calibration or adjustment.

Since the liquid entering the measuring device comes through the ports 17 at the bottom thereof, the float 13 is not affected by surging or small surface ripples since it is protected by the tube 11 and when the indicator 15 is at a standstill it accurately represents the amount of liquid within the tank. Furthermore, there can be no erroneous indications as is the case when utilizing a stick due to the creeping of the liquid up the side of the stick.

It has been found that the present device is practicable, easily manipulated and handled and accurate for the measuring of liquids in tanks and is particularly suited for use in large tanks such as are utilized for storing gasoline although, obviously, it may be used with tanks of small capacities and for measuring any liquid substance.

I claim:

1. A portable liquid measuring device comprising an elongated tube, a second tube slidably mounted in the first-mentioned tube, means for prohibiting the relative rotation of said tubes, a float mounted within the first-mentioned tube and indicating means connected to said float and adapted to register with said second-mentioned tube to indicate the volume of liquid in the container being measured thereon.

2. A liquid measuring device comprising an elongated upright tube, a scale telescopically mounted in the top of said tube, means for locking said scale when in its extended position in relation to said tube, a float mounted in said tube and indicating means connected to said float and adapted to register with said scale to indicate the position of said float within said tube upon said scale.

3. A liquid measuring device including an elongated upright tube, a polygonal shaped scale member telescopically mounted within said tube and passing through the top thereof, means for locking said scale member in its extended position and means for indicating on said scale the height of a column of liquid in said tube.

4. A liquid measuring device comprising a tube, a cap for said tube, a scale member telescopically mounted in said tube and passing through a perforation in said cap, means for locking said scale member in its extended position, a float mounted within said tube, means positioned at the bottom of said tube for retaining said float therein, and indicating means connected to said float and reading upon said scale.

5. A liquid measuring device comprising an elongated tube having perforations in the bottom thereof, a scale member slidably mounted within said tube and projecting from the top thereof, means for prohibiting the rotation of said scale relative to said tube, locking means for holding said scale in extended position, a float mounted within said tube and an indicator operated by said float and reading upon said scale.

In testimony whereof I have hereunto subscribed my name.

WILLIAM F. HORSTING.